United States Patent
Selgas et al.

(10) Patent No.: US 8,737,624 B2
(45) Date of Patent: *May 27, 2014

(54) SECURE EMAIL COMMUNICATION SYSTEM

(71) Applicant: MyMail Technology, LLC, San Angelo, TX (US)

(72) Inventors: Thomas Drennan Selgas, Athens, TX (US); Jonathan Cutrer, San Angelo, TX (US)

(73) Assignee: MyMail Technology, LLC, San Angelo, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/769,665

(22) Filed: Feb. 18, 2013

(65) Prior Publication Data

US 2013/0156184 A1 Jun. 20, 2013

Related U.S. Application Data

(63) Continuation of application No. 12/237,258, filed on Sep. 24, 2008, now Pat. No. 8,379,867.

(60) Provisional application No. 60/974,776, filed on Sep. 24, 2007.

(51) Int. Cl.
H04L 9/08 (2006.01)

(52) U.S. Cl.
USPC ........... 380/282; 380/259; 380/277; 380/278; 380/279; 713/193

(58) Field of Classification Search
None
See application file for complete search history.

(56) References Cited

U.S. PATENT DOCUMENTS

| | | |
|---|---|---|
| 5,204,966 A | 4/1993 | Wittenberg et al. |
| 5,432,934 A | 7/1995 | Levin et al. |
| 5,497,421 A | 3/1996 | Kaufman et al. |
| 5,581,700 A | 12/1996 | Witte |
| 5,708,777 A | 1/1998 | Sloan et al. |
| 5,719,941 A | 2/1998 | Swift et al. |
| 5,748,735 A | 5/1998 | Ganesan |
| 5,850,443 A | 12/1998 | Van Oorschot et al. |
| 5,941,947 A | 8/1999 | Brown et al. |
| 6,009,173 A | 12/1999 | Sumner |
| 6,061,448 A | 5/2000 | Smith et al. |
| 6,151,609 A | 11/2000 | Truong |
| 6,161,139 A | 12/2000 | Win et al. |
| 6,182,142 B1 | 1/2001 | Win et al. |
| 6,223,284 B1 | 4/2001 | Novoa et al. |

(Continued)

OTHER PUBLICATIONS

Schneier, Applied Cryptography, 1996, John Willey & Sons, $2^{nd}$ Edition, pp. 179-180.*

(Continued)

*Primary Examiner* — Minh Dinh
(74) *Attorney, Agent, or Firm* — Gardere Wynne Sewell LLP

(57) ABSTRACT

The present invention provides a method and system for securing a digital data stream. A first key of a first asymmetric key pair from a key store remote from a host node is received at the host node. A dynamically generated key is received at the host node, which is used to encipher the digital data stream. The dynamically generated key is enciphered with the first key of the first asymmetric key pair. The enciphered digital data stream and the enciphered dynamically generated key are stored remotely from the host node and the key store.

16 Claims, 7 Drawing Sheets

(56) References Cited

U.S. PATENT DOCUMENTS

| | | |
|---|---|---|
| 6,370,250 B1 | 4/2002 | Stein |
| 6,408,336 B1 | 6/2002 | Schneider et al. |
| 6,412,070 B1 | 6/2002 | Van Dyke et al. |
| 6,453,353 B1 | 9/2002 | Win et al. |
| 6,533,583 B1 | 3/2003 | Sportelli |
| 6,571,290 B2 | 5/2003 | Selgas et al. |
| 6,636,973 B1 | 10/2003 | Novoa et al. |
| 6,834,112 B1 | 12/2004 | Brickell |
| 6,871,286 B1 | 3/2005 | Cagle et al. |
| 6,986,049 B2 | 1/2006 | Delany |
| 7,039,949 B2 | 5/2006 | Cartmell et al. |
| 7,051,077 B2 | 5/2006 | Lin |
| 7,185,192 B1 | 2/2007 | Kahn |
| 7,213,158 B2 | 5/2007 | Bantz et a |
| 7,228,437 B2 | 6/2007 | Spagna et al. |
| 7,249,261 B2 | 7/2007 | Charbonneau |
| 7,308,580 B2 | 12/2007 | Nelson et al. |
| 7,320,076 B2 | 1/2008 | Caronni |
| 7,487,548 B1 | 2/2009 | Conover |
| 7,506,010 B2 | 3/2009 | Kulkarni et al. |
| 7,680,819 B1 | 3/2010 | Mellmer et al. |
| 7,693,285 B2 | 4/2010 | Curry |
| 7,761,404 B2 | 7/2010 | Chen et al. |
| 7,765,298 B2 | 7/2010 | Villavicencio |
| 7,865,373 B2 | 1/2011 | Punzak et al. |
| 7,975,292 B2 | 7/2011 | Corella |
| 7,996,683 B2 | 8/2011 | Lyseggen et al. |
| 8,019,085 B2 | 9/2011 | Adams et al. |
| 8,127,149 B1 | 2/2012 | Nachenberg |
| 8,151,112 B2 | 4/2012 | Lin |
| 8,281,125 B1 | 10/2012 | Briceno et al. |
| 8,379,867 B2 | 2/2013 | Selgas et al. |
| 2002/0095499 A1 | 7/2002 | Barnett et al. |
| 2002/0129238 A1 | 9/2002 | Toh et al. |
| 2004/0091114 A1 | 5/2004 | Carter et al. |
| 2004/0103324 A1 | 5/2004 | Band |
| 2005/0204030 A1 | 9/2005 | Koch et al. |
| 2006/0259960 A1 | 11/2006 | Kondo |
| 2007/0033657 A1 | 2/2007 | Murakawa |
| 2007/0250920 A1 | 10/2007 | Lindsay |
| 2008/0065878 A1 | 3/2008 | Hutson et al. |
| 2009/0064297 A1 | 3/2009 | Selgas et al. |
| 2009/0077136 A1 | 3/2009 | Igawa et al. |
| 2009/0080650 A1 | 3/2009 | Selgas et al. |
| 2009/0100529 A1 | 4/2009 | Livnat et al. |
| 2009/0158037 A1 | 6/2009 | Lee et al. |
| 2009/0259588 A1 | 10/2009 | Lindsay |
| 2009/0300351 A1 | 12/2009 | Lei et al. |
| 2010/0146268 A1 | 6/2010 | Van Dorsselaer et al. |
| 2010/0161759 A1 | 6/2010 | Brand |
| 2010/0169948 A1 | 7/2010 | Budko et al. |
| 2010/0257372 A1 | 10/2010 | Seifert |
| 2010/0293147 A1 | 11/2010 | Snow et al. |
| 2010/0318782 A1 | 12/2010 | Auradkar et al. |
| 2010/0333116 A1 | 12/2010 | Prahlad et al. |
| 2011/0289310 A1 | 11/2011 | Selgas et al. |

OTHER PUBLICATIONS

Ala-Luukko Sami, Mobility Management in IEETF and GPRS Specifications, Helsinki University of Technology, May 15, 2000.

Proofpoint; Encryption Made Easy: The Advantages of Identity Based Encryption:; Proofpoint, Inc., Sunnyvale, California; 2005.

Wong, M. et al; RFC 4408—Sender Policy Framework (SPF) for Authorizing Use of Domains in E-Mail, Version 1:; Network Working Group, the Internet Society; Apr. 2006.

Microsoft; "Microsoft Exchange Hosted Encryption" Data sheet; Microsoft Corp.; 2006; http://www.microsoft.com/exchange/services.

Allman et al.; "RFC—DomainKeys Identified Mail (DKIM) Signatures"; Network Working Group, IETF Trust; May 2007, 4870.

Microsoft; "Sender Reputation, Microsoft TechNet, Exchange 2007"; Microsoft Corp. 2008.

* cited by examiner

SECURE EMAIL COMMUNICATION SYSTEM

CROSS-REFERENCE TO RELATED APPLICATIONS

Pursuant to 35 U.S.C. §120, this application is a continuation of U.S. patent application Ser. No. 12/237,258, entitled "Secure Email Communication System," filed Sep. 24, 2008 and naming Thomas Selgas and Jonathan Cutrer as inventors, which claims the benefit of the filing date of U.S. Provisional Patent Application Ser. No. 60/974,776, entitled "Electronic Transmission Privacy and Security Method," filed Sep. 24, 2007 and naming Thomas Selgas and Jonathan Cutrer as inventors, the entire contents of both of which are incorporated herein by reference for all purposes.

BACKGROUND

1. Technical Field

The present invention relates to ensuring transmission of data securely and privately and, more particularly, to the secure and private enciphering and storing of data.

BACKGROUND

Concerns about the security and privacy of data transmitted across the internet have grown in recent years due to the increased efforts from third parties to gain unauthorized access to the flow of private data. More and more personal details and private communications are subject to interception by advertisers, market data collectors, snoopers and hackers, which ultimately result in disruption to the daily routine of individuals and businesses. Such disruptions include SPAM, identity theft, unwanted telemarketer phone calls and advertisement insertions into our personal communications. End users of the internet suffer the consequences of such disruptions by paying for the repair of affected systems.

To address these concerns, the United States federal government has legislated security and privacy requirements. For example, the Security Standards for the Protection of Electronic Protected Health Information, commonly known as HIPAA, calls for technical mechanisms to safeguard the integrity confidentiality and availability of private health information across the Internet and internal networks. The Family Educational Rights and Privacy Act (FERPA) requires institutions to protect private records pertaining to a student's education records. These laws and other similar state laws address the concern that private information, which may be at times transmitted across the Internet for legitimate purposes, should remain private and secured.

Private email providers, however, have changed their service agreements not to assist in maintaining the privacy and security of end-users, but to increasingly allow access to private communications. For example, the terms of service agreements of many of today's free email service providers and popular internet service providers, typically using standard non-secure email solutions to provide email service, have been rewritten to allow providers to scan and read every email messages for information, which they in turn sell to advertisers to "help keep their prices competitive."

Another problem users of existing email solutions face is that they typically allow system administrators complete unfettered access to email accounts and credentials (such as username and password), which allows them to read, edit and delete end-users' email messages without their knowledge. Further, this unfettered access allows system administrators to send email messages as though they were from another. Thus, whether the end user is a consumer worried about her personal financial information, a lawyer needing to maintain privileged communications with a client, a healthcare worker concerned about HIPAA privacy laws, the concerns about internet security and privacy continue.

To address one or more of these problems in security and privacy of internet data, enciphering methods have been utilized. Generally, these methods utilize digital keys to encipher the contents of a message into a format that is undecipherable by third parties without the encipher key or a corresponding decipher key. Symmetric enciphering utilizes a single "secret" key used to encipher a message into "CypherText" (gibberish) and to decipher (restore) the message back to its original form. Symmetric key enciphering significantly reduces eavesdropping, makes message modification nearly impossible, and given the right key it is extremely difficult thwart. The problem with symmetric key enciphering is that both the sender and recipient share the same secret key, which means that they have had to meet privately in order to share the secret key with one another. Because of this, symmetric key enciphering is often not practical for an initial key exchange as the sender and recipient may be thousands of miles from one another. In general, symmetric key enciphering is more secure than asymmetric key enciphering (discussed below), but lacks the practicality of an initial key exchange mechanism provided by asymmetric key enciphering.

Asymmetric key enciphering (sometimes referred to as "public key" encryption) utilizes a minimum of two unique keys. A "public key" and a "private key" key pair are used to encipher and decipher a message. When two sets of "public" and "private" keys are used (where one set of keys belongs to the "message sender" and the other set of keys belongs to the "message recipient") a message can be enciphered then deciphered, and the identities of the sender and recipient can be established. That is, using asymmetric key enciphering, not only secures the message but ensure the identities of the sender and recipient by using the "private key" of the sender to encipher the message and then taking that enciphered message and enciphering it again using the "public key" of the recipient, which ensures that only the recipient can open the message by using his "private" key and then using the sender's "public" key to confirm that the message was in fact sent by the recipient.

Even with these enciphering methods, existing email services (secure and non-secure) still encounter inherent security risks caused by storing large amounts of email messages using the same encipher keys. Such a practice produces detectable repetitive patterns in the data and provides a mechanism for third parties to "break in" and gain access to email message data. What is needed is a system that reduces the risk of break in by eliminating repetitive pattern detection.

In view of the above, there exists a need for a secure communication system that may make electronic information access, storage, and transmission safe from penetration or interception by unauthorized persons. Further, a need exists for an easy-to-use email encipher system which may meet and exceed the regulatory standards set out by the federal government.

SUMMARY

The present invention provides for a method and system for securing a digital data stream. In the invention, a key of an asymmetric key pair is received at a host node from a key store, and used to encipher a dynamically generated key. The dynamically generated key is also received at the host node, and used to encipher the digital data stream.

The enciphered digital data stream and the enciphered dynamically generated key are stored remotely from the host node and the key store.

BRIEF DESCRIPTION OF THE DRAWINGS

For a more complete understanding of the present invention and the advantages thereof, reference is now made to the following Detailed Description taken in conjunction with the accompanying drawings, in which.

DETAILED DESCRIPTION OF THE DRAWINGS

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, specific details, and the like have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or as software instructions for enabling a computer to perform predetermined operations, where the software instructions are embodied on a computer readable storage medium, such as RAM, a hard drive, flash memory or other type of computer readable storage medium known to a person of ordinary skill in the art. In certain embodiments, the predetermined operations of the computer are performed by a processor such as a computer or an electronic data processor in accordance with code such as computer program code, software, and, in some embodiments, integrated circuits that are coded to perform such functions.

It is to be understood by persons of ordinary skill in the art that the secure data method and system may be implemented in other systems besides electronic mail account systems described herein. For example, banking account, credit card account, retail account, or any other set of personal or organizational data systems that are intended to be securely maintained may be further secured by use of the secure data transmission, processing and storage methods and apparatus herein described. The use of email messages as data is intended as illustrative of the present invention rather than limiting the apparatus and methods described herein.

Figure 1:
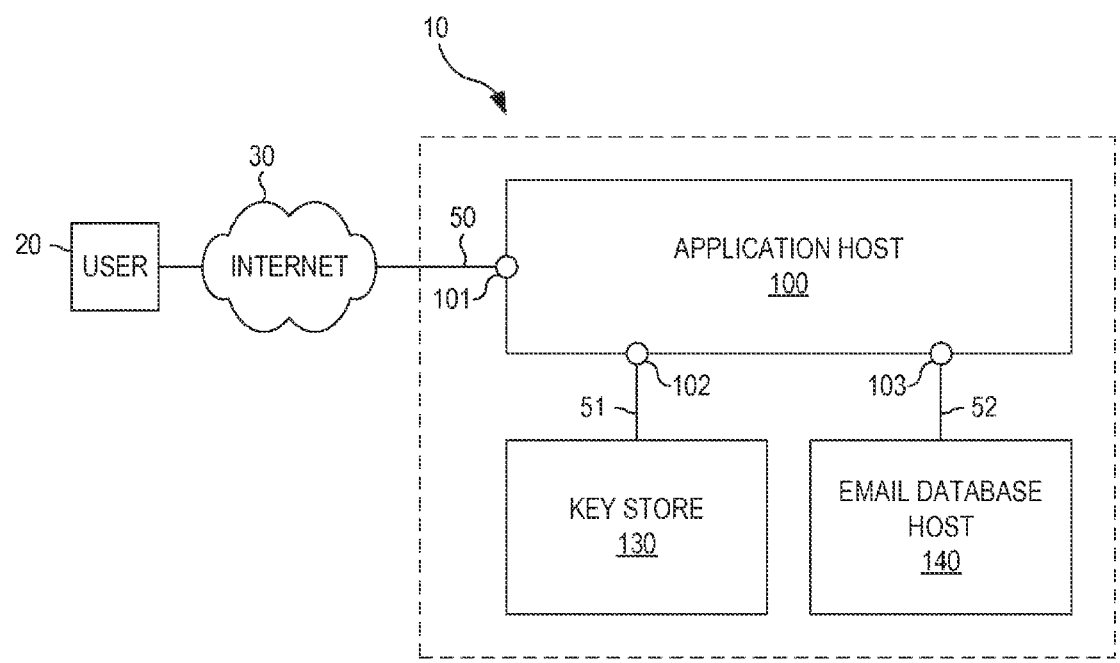
FIG. 1 illustrates a schematic of at least one embodiment of a secure email communication system.

Referring now to FIG. 1, there is presented an embodiment for the architecture for a secure email system 10 for securely and privately communicating, storing and transmitting email messages. Secure email system 10 may comprise at least three groups of servers an application host 100, an email database host 140, and a key store 130, wherein each may comprise one or more computers capable of executing computer instructions embodied on computer readable storage medium. Each of the application host 100, the email database host 140, and the key store 130 may act as a node for communicating data.

Further, each group of servers may comprise one or more computers logically connected to one another by data connections. The application host 100 may be coupled to the email database host 140 by at least one private network connection 52. The application host 100 may also be coupled to the key store 130 by at least one private network connection 51. The application host 100 may utilize at least one public network connection, such as an internet connection 50, which may connect the application host 100 to a user 20 through the internet 30 or other computer or telecommunications network configured for communicating digital data streams. The user 20 may comprise one or more subscribers who hold one or more email accounts which are hosted on the secure email system 10. The user 20 may access the secure email system 10 via the internet 30 by a computer device, cell phone device, or other processor for receiving and handling digital data that would be known to a person of ordinary skill in the art.

Application host 100 may comprise a data stream port 101, a key port 102 and a database port 103, which may act as a gateway for data passing through each respective port. In some embodiments, the data stream port 101 is connected to the internet 30 and is capable of sending and receiving secure socket layer (SSL) and/or Transport Layer Security (TLS) enciphered messages. Using SSL or TLS connections may allow one to determine that the connection between the application host 100 and a server opposite the connection is correct and secure.

The key store 130 and the email database host 140 may be logically remote from application host 100 in the sense that the key store 130 and the email database host 140 are each independently controlled, operate autonomously, and communicate using limited physical connections and protocols. It should be understood, however, that application host 100, key store 130, and the email database host 140 may be physically separated but still be located all or in part at a single facility.

In some embodiments, the functions performed by the application host 100 and the email database host 140 may be performed by a combined application host (not shown). In some embodiments, this implementation may not be as secure as separating the email database host 140 from the internet connection 50 by the private network connection 52.

Figure 2:
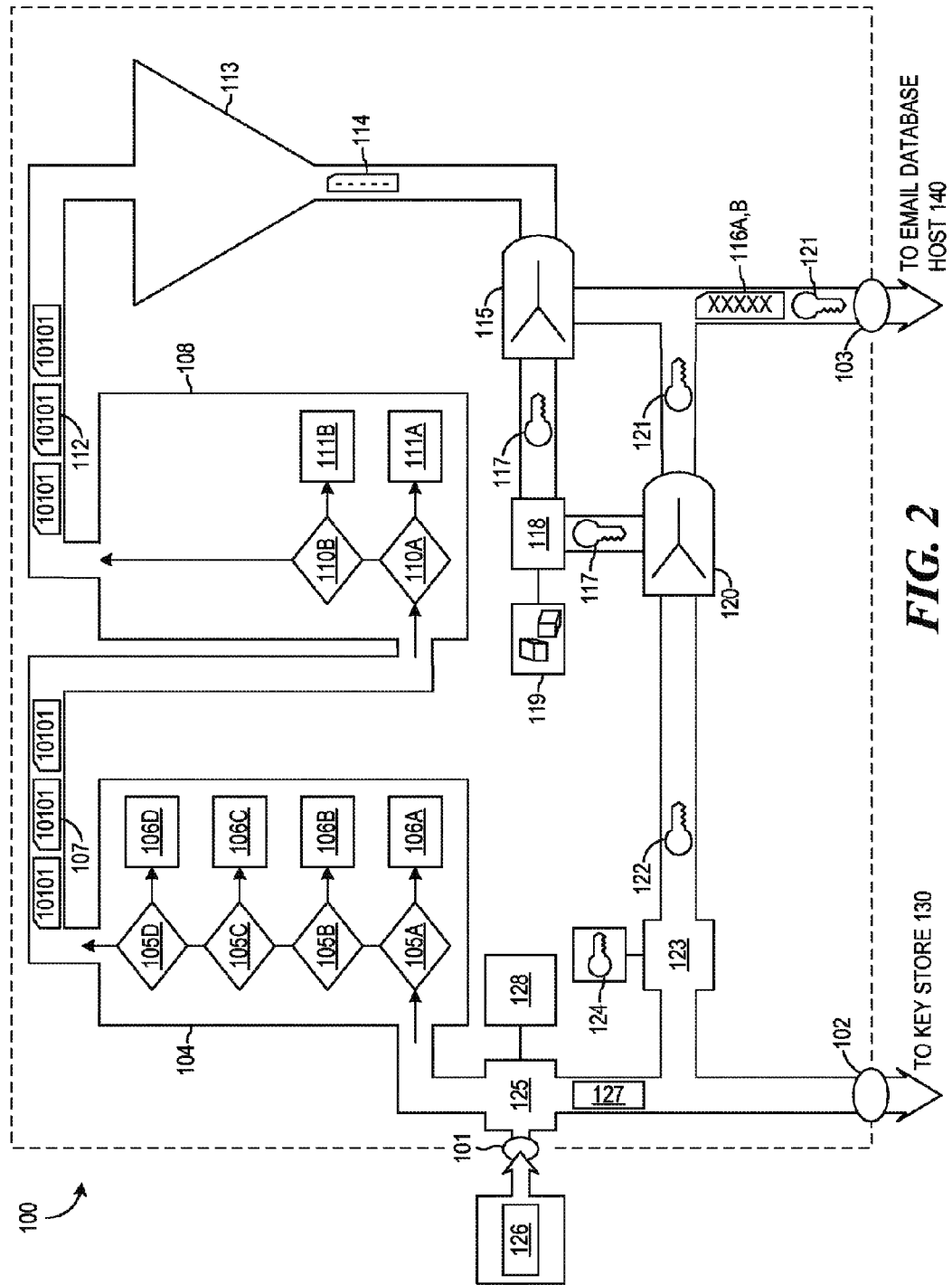
FIG. 2 illustrates a schematic of at least one embodiment of an application host of a secure email communication system.

Referring now to FIG. 2, there is presented a schematic diagram of at least one embodiment of the application host 100. Data stream port 101 may be coupled to a control node 125. The control node 125 may determine whether an encipher or a decipher key is required from the key store 130. Coupled to the control node 125, a one-way module 128 may pass a portion of an incoming message to the key store 130 in order to acquire a desired key.

After acquiring a key from the key store 130, an initial validation module 104 may check an incoming message 107 from data stream port 101 for signs of invalidity, using decision modules 105a-d. In some embodiments, the incoming message 107 on data stream port 101 may in part comprise one or more user credentials, such as a combination of a user id, a user password 126, or a password indicia 127 of the user password 126. In other embodiments, credentials of the user 20 may include other data that would be known by a person of ordinary skill in the art to be used to access secure data, such as biometrics, RFID, physical or electronic keys, or other alphanumeric and symbolic combinations.

Decision modules 105a-d may include, for example, checks for an invalid source internet protocol (IP) address, an illegal connection, an unmatched domain IP-address pair, an unhosted domain, an excessive length or file size of the message, system wide black-listed email addresses, and an invalid recipient identification. If any of decision modules 105a-d are triggered, a corresponding one of response modules 106a-d may be triggered. In some embodiments, response modules 106a-d may delete the incoming message 107. In some embodiments, one or more of response modules 106a-d may reply to the sender of the message 107 with an error report. It should be noted that, although four decision modules are illustrated in initial validation module 104, a greater or lesser quantity may be used.

In the illustrated embodiment, the message 107 is shown as having successfully passed through initial validation module 104, and may await screening by guard module 108, which may be logically coupled to initial validation module 104. Message 107 may comprise an email header information 107a (not shown) which may contain a subject line, a sender's email address, and other information needed to transport the message 107 across the network to its intended recipient. Guard module 108 may comprise decision modules 110a-b, which may determine the disposition of incoming messages, such as message 107, and trigger a corresponding one of response modules 111a-111b.

Figure 3:
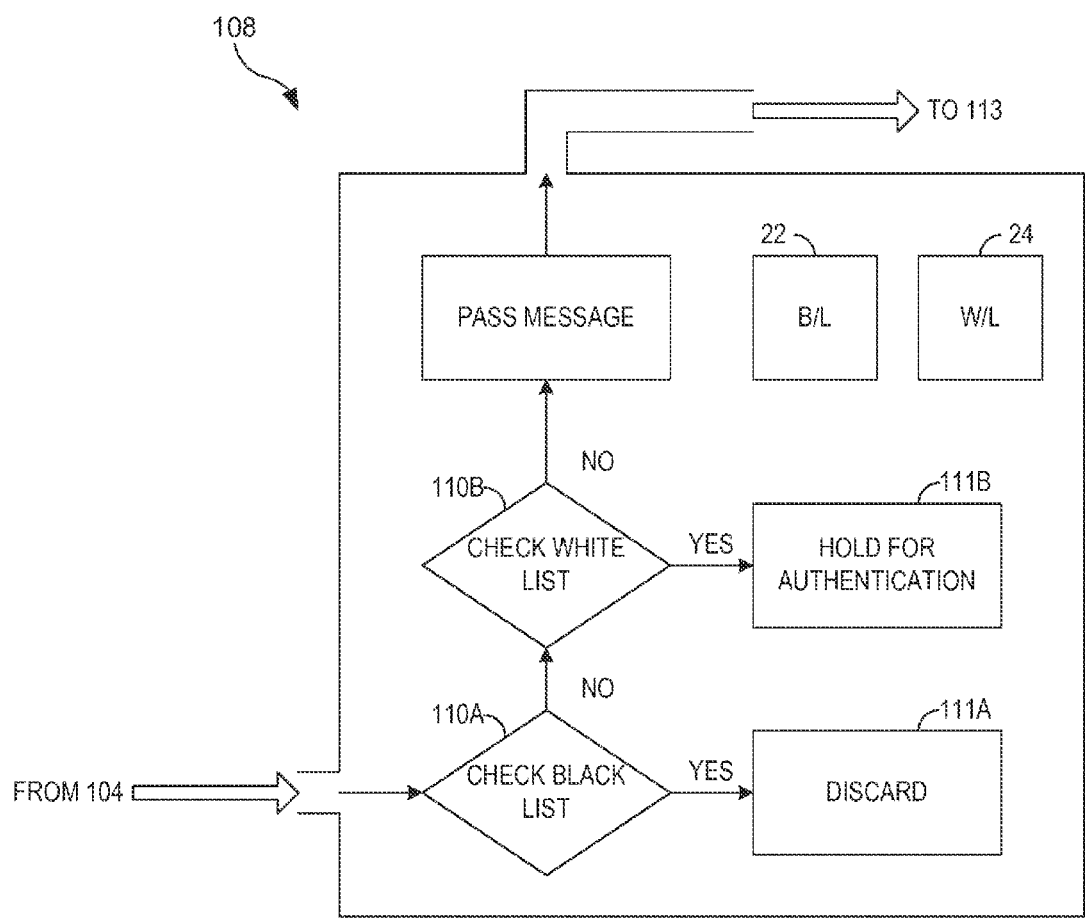
FIG. 3 illustrates at least one embodiment of a guard module.

Referring now to FIG. 3 there is shown an illustration of the operations of the guard module 108. The decision modules 110a-b may comprise checks for the message sender's identity against a black list 22 and a white list 24 of the user 20. For example, decision module 110a may check a message sender's identity against the black list 22, which indicates a sender to be blocked, which triggers response module 111a to reject the associated message in the event of a match. In some embodiments, the response module 111a may include instructions to discard the blacklisted message. As a further example, decision module 110b may check a message sender's identity against the white list 24, which indicates a sender to be allowed, which triggers response module 111b to either allow the message to pass or to hold the associated message 107 and request sender identity verification, depending on whether there is a match. It should be noted that, although two decision modules are illustrated in guard module 108, a greater or lesser quantity may be used.

In at least one embodiment, the guard module may work by using a send-self-authentication mechanism that adds legitimate email addresses to the white list 24 of the user 20 and illegitimate email addresses to the blacklist 22 and "yet to be identified" addresses to a holding box (not shown), which is accessible by each email recipient through a secure webbrowser interface. The guard module 108 may be configurable to allow the user 20 to control which senders may be accepted as legitimate. The user 20 may add a sender, identified by an email address, to the white list 24. In some cases, a challenge-and-response protocol may be configured to automatically add a sender email address to the white list 24, pending a challenge and response. This may allow for senders to be authenticated either manually by the user or by passing the challenge-response protocol.

In some embodiments, a challenge-and-response protocol may request from a sender a response to verify the identity of the sender. A message such as an email message may be sent to the sender which requires a response, such as a separate email message or a CAPTCHA response.

Figure 5:
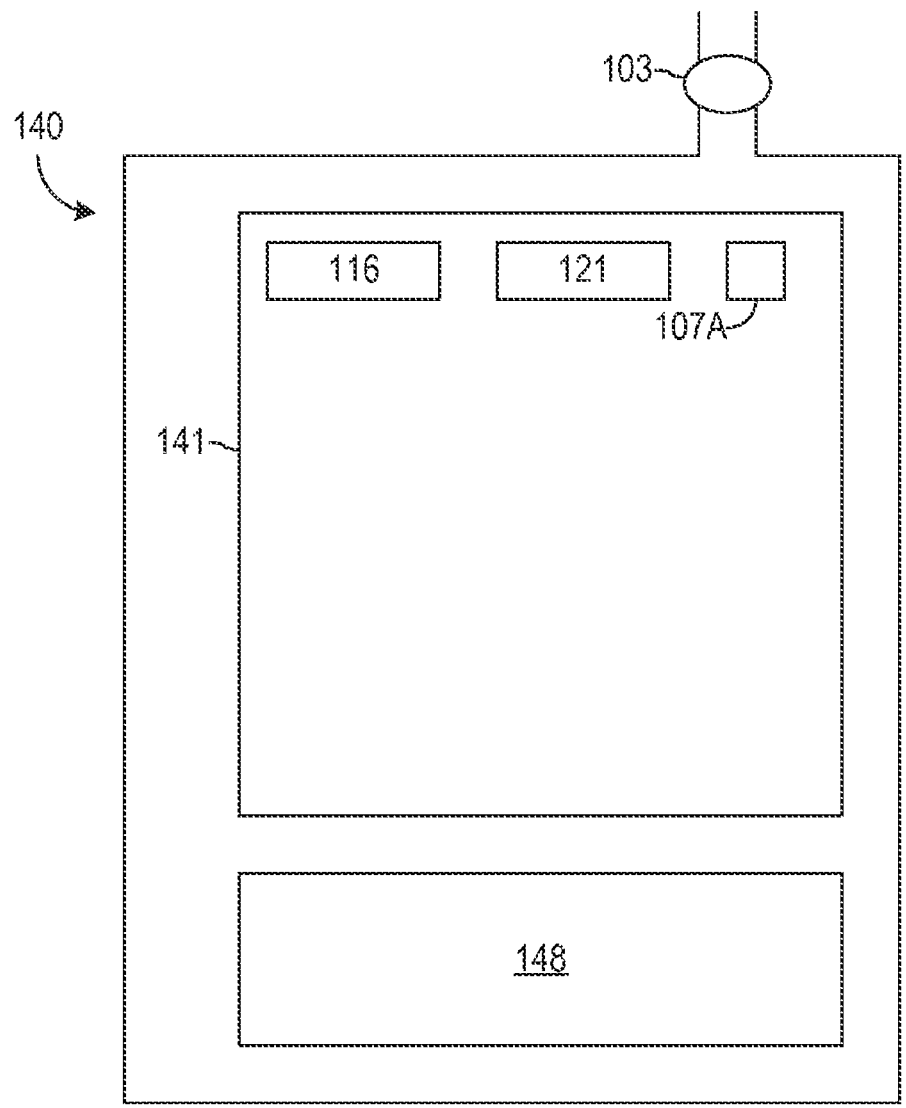
FIG. 5 illustrates a schematic of at least one embodiment of an email database host.

Messages from senders who fail to respond may be held in a non-authenticated sender storage space 148 (not shown) of the user mail account. The storage space 148 may be hosted in the email database host 140, as shown in FIG. 5. These unauthenticated sender messages may be held in this storage space 148 until a change of status event occurs, such as the message sender authenticates him or herself, the intended mail recipient, the user, accepts or rejects the unauthenticated message, the message is deleted after a period of aging, like 15 days, the user mail box space is full and older unauthenticated messages are deleted as a result of a system policy, or the sender fails to authenticate himself according to the challenge-response protocol after several attempts. This list of reasons that an unauthenticated message is removed from a separate storage space 148 of the user 20 is not intended as exhaustive.

The guard module 108 may include a blacklisting feature. This feature may immediately terminate any attempted mail delivery to a recipient from an email address listed in the blacklist 22 of the user 10. In some embodiments, the user 20 may manually add the email address of an unauthenticated sender to the black list 22. A requirement that designation of a sender to the blacklist is manual may be a safety feature in the secure email system 10, which may prevent loss of possibly valid messages.

Referring again to FIG. 2, message 112 is shown as having successfully passed through the guard module 108, and is awaiting compression by a compression module 113, which is logically coupled to the guard module 108. In some embodiments, the guard module 108 may have authenticated the sender of message 112, formerly message 107. The compression module 113 may comprise, for example, a Lempel-Ziv compression algorithm, or a different compression algorithm known to a person of ordinary skill in the art, and outputs a compressed message 114.

An encipher module 115 may be logically coupled to the compression module 113, to accept and encipher the output of the compression module 113. In some embodiments, the encipher module 115 may implement the Advanced Encryption Standard (AES) algorithm, which is a symmetric enciphering algorithm, because it uses the same key for enciphering as is used for deciphering. In some embodiments, 256-bit encipher may be used. A person of ordinary skill would recognize that other encipher keys such as 128-bit and 192-bit may be used.

The encipher module 115 may receive the compressed message 116 from the compression module 113. The output of the encipher module 115 may be coupled to the database port 103 to output an enciphered message 116 to the email database host 140. The enciphered message 116 may comprise an enciphered message body portion 116a and an enciphered header portion 116b of at least some part of the header information of the message 107, but may exclude at least a portion of header information 107a (not shown) which may comprise information in plain text substantially necessary to transport the message across the internet to its intended recipient. The enciphered header portion 116b may correspond to at least what are commonly known as the "subject" and "from" fields in an email message header. It may be advantageous to maintain only a minimal amount of information in header information 107a and mask other information such as internet protocol (IP) addresses.

The encipher module 115 may use a session key 117, which may be dynamically generated by a dynamic key generation module 118. In some embodiments, the key generation module 118 may generate the session key 117 by sampling a random number source 119, which is coupled to the key generation module 118. In some embodiments, the random number source 119 may comprise a hardware random number source, such as a hardware gamma decay apparatus, which is undersampled in order to reduce the possibility of a correlation between subsequent samples. It is to be understood that other methods known by persons of ordinary skill in the art of random number generation may be utilized.

The application host 100 additionally may comprise an encipher module 120, which is also coupled to the key generation module 118 and the encipher module 115, to receive and enciphered session key 117, thereby producing an enciphered session key 121. In some embodiments, the encipher module 120 may comprise an OpenSSL encipher module, which implements an asymmetric encipher algorithm using a pair of keys, one for enciphering and one for deciphering. The encipher module 120 may output the enciphered session key 121 to the email database host 140, for storage along with the enciphered message 116. After the enciphered message 116 and the enciphered session key 121 are sent to the email database host 140 for storage and stored remotely, in some embodiments from the application host 100 and the key store 130, all copies of the session key 117 and the enciphered session key 121 may be deleted from the application host 100, in order to reduce the likelihood of a key grab by an unauthorized party.

A key 122 used by encipher module 120 may be provided by the key store 130 through key port 102. The key 122 will be one of two keys in an asymmetric key pair, which is correlated with the intended recipient of the message 107, based on whether encipher module 120 is enciphering the dynamically generated session key 117 for storage in the email database host 140 or deciphering the enciphered session key 121 retrieved from the email database host 140, which may be sent to the user's computer for display. In the case that the incoming message 107 and the dynamically generated session key 117 are to be enciphered for storage in the email database host 140, the encipher key of a key pair correlated with the message recipient may be used. However, in the case that the enciphered message 116 and the enciphered session key 121 are retrieved from storage in the email database host 140 for decipher and display on the message recipient's computer, the decipher key of the key pair correlated with the recipient may be used. In some embodiments, the encipher modules 115 and 120 can perform both enciphering and deciphering.

In some embodiments, key store 130 may provide the key 122 to application host 100 in enciphered form. Thus, in the illustrated embodiment, application host 100 may further comprise a decipher module 123, coupled between the key port 102 and the encipher module 120, in order to the decipher key 122 for use by encipher module 120. Decipher module 123 typically uses the decipher key 124 to perform the deciphering process on the key 122. The decipher key 124, may be, for example, the decipher key of an asymmetric key pair used for communication between application host 100 and key store 130, if decipher module 123 comprises an asymmetric decipher algorithm. Further, the decipher key 124 may be calculated from the password 126 or other credentials of the user. It should be understood that, for some asymmetric encipher and decipher algorithms, the identification of one key of an asymmetric key pair as the encipher key and one as the decipher key is somewhat arbitrary if either key in the pair could be used for either role and the other used in the complementary role.

The application host 100 may communicate the need for either an encipher key or a decipher key to the key store 130 using output from control node 125, which is coupled to data stream port 101. The control node 125 may determine whether the incoming message 107 addressed to a subscriber recipient is to be enciphered and stored for later retrieval by the recipient, or whether the stored message 116 is being retrieved by the recipient and is to be sent to the recipient for display on the recipient's computer. The control node 125 can make this determination based on whether data received from the data stream port 101 comprises an external message or user login session credentials of a subscriber, such as the user 20. If the data incoming on data stream port 101 comprises user login session credentials, such as the password 126, the control node 125 may request a decipher key corresponding with the identity of the user 20.

In some embodiments, the control node 125 may receive a credential, like the password 126, from the user and may convert it to the password indicia 127, for example a 32-bit hash result, using a one-way module 128 coupled to control node 125. Control node 125 may then pass the password indicia 127 to the key store 130 to identify the decipher key needed. In some embodiments, the user's computer may perform a one-way function on an input credential, such as the password 126, and send the password indicia 127, rather than the password 126, to the application host 100 via the data stream port 101. Alternatively, the control node 125 may determine a recipient's identity from an incoming message to produce a user indicia 129 (not shown). This may then be passed to key store 130, which identifies the key 122 by correlating the incoming message with an encipher key that corresponds to the recipient user's identity as reflected in the user indicia 129. In other embodiments, other credentials of the user 20 may be utilized to generate an indicia for accessing the keys of the user 20 stored in the key store 130.

The key store 130, which is coupled to application host 100, may operate autonomously from the application host 100, and may communicate with application host 100 through a monitored, limited functionality data channel, that is controlled at both ends by the respective operating systems of key store 130 and application host 100. Thus, key store 130 may be a peer of application host 100, rather than being subject to control by application host 100. This arrangement may allow key store 130 to maintain an independently secure operation in the event that application host 100 is compromised by an outside party via data stream port 101.

The key store 130 may further comprise a Representation State Transfer "REST" web service with a command link interface. Access to key store 130 may be restricted to the source IP addresses of the application host 100 through one or more valid credentials.

Figure 4:
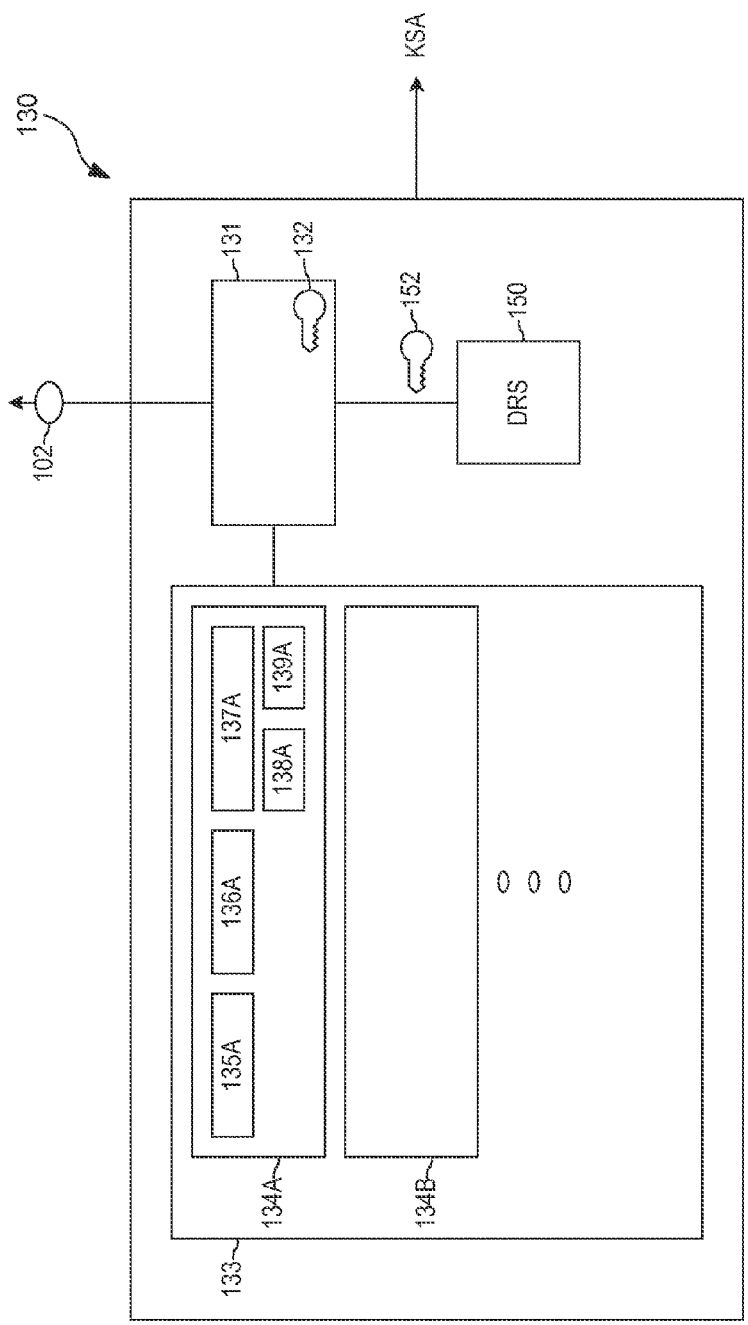
FIG. 4 illustrates a schematic of at least one embodiment of a key store.

In the illustrated embodiment shown in FIG. 4, the key store 130 may comprise an encipher module 131, which may perform the complementary cryptographic process for the decipher module 123 in application host 100, and uses encipher key 132, which may be the complementary encipher key to decipher key 124. The encipher module may further comprise a dynamic row secrets key generator 150 which may generate a key store dynamic row secret (DRS) 152 for the key store 130. The key store DRS 152 may be used to encipher a public encipher key and enciphered private decipher key of the user 20. This complementary cryptographic process may include enciphering the key store DRS 152. For embodiments employing asymmetric encipher among encipher modules 131 and 123, encipher key 132 may be the other one of an asymmetric key pair that includes decipher key 124.

Referring to FIG. 4, the key store 130 may further comprise a paired key list 133. The paired key list 133 may comprise a list of user entries 134*a-b* corresponding to each of multiple subscribing users. The paired key list 133 may be stored on an enciphered MySQL database on key store 130. When new mail for the user 20 arrives at the application host 100, a request is made by the application host 100 to the key store 130 for key data of the user 20. Such a request may occur at login of the user 20 when the user access the mail of the user by Webmail or POP3, for example.

In some embodiments, the key store 130 may be configured to communicate with a Key Signing Authority (KSA), as shown in FIG. 4, in order to generate the key pair comprising the public encipher key and the private encipher key for the user 20. Generating the key pair may include taking credentials of the user such as the user id and the password and processing them through a hardware random number generated algorithm to create the public encipher key. The key store 130 may initiate a key signing request to the KSA. The KSA may sign the key signing request using the key signing authority's signing key and certificate, which may result in the creation of the private decipher key of the user. The private decipher key of the user may be returned to the key store 130. The private encipher key may be encrypted for storage using the password 126 of the user 20.

In the illustrated embodiment, the user entry 134a may comprise data relating to the user 20 such as user identity indicia 135a, user password indicia 136a, and an asymmetric key pair 137a, which comprises a public encipher key 138a and a private decipher key 139a of the user 20. The key pair 137a may have been generated using the KSA, as described above. The user entry 134b may comprise equivalent information blocks for a different user. Thus, when the control node 125 sends the identity indicia 129 (not shown), the key store 130 may match this information with the user identity indicia 135a, select the encipher key 138a, and send it through the encipher module 131 to the key port 102 to become the key 122. Alternatively, when the control node 125 sends the password indicia 127 (not shown), the key store 130 may match this information with password indicia 136a, select decipher key 139a, and sends it through the encipher module 131 to the key port 102 to become the key 122.

Referring now to FIG. 5, the email database host 140, which may also be coupled to application host 100, may operate autonomously from the application host 100, and communicate with the application host 100 through a monitored, limited functionality data channel, that is controlled at both ends by the respective operating systems of the email database host 140 and application host 100. Thus, the email database host 140 may be a peer of application host 100, rather than being subject to control by the application host 100. This arrangement allows the email database host 140 to maintain an independently secure operation in the event that the application host 100 is compromised by an outside party via the data stream port 101.

After the user 20 is authenticated on the email database host 140, a secure socket layer (SSL) may be opened between the email database host 140 and the application host 100. The email database host 140 may assign the dedicated data stream port 101 to the application host 100 and all information passing through this port is enciphered.

In the illustrated embodiment shown in FIG. 5, the email database host 140 may comprise message database 141, which stores the enciphered message 116 and enciphered session key 121 for later retrieval by the user 20. The enciphered message 116 and the enciphered session key 121 may be associated in database 141 so that when the enciphered message 116 is retrieved, the enciphered session key 121 is also retrieved. The enciphered message 116 and the enciphered session key 121 may be contained within the same file or may be stored separately and associated using relational aspects of the message database 141.

On the email database host 140, the enciphered message 116 may be stored in a database format by default. A file system format for data storage may be available to the administrator if desired. The enciphered session key 121 may serve as the fingerprint/signature for the enciphered message 116. Typically, the message 107 (not shown) may contain the header information 107a (not shown) needed to send the enciphered message 116 through the internet. The header information 107a may remain un-enciphered and in plain text in order for the enciphered session key 121 and the enciphered message 116 to propagate through the internet. The enciphered message 116 may be shredded into four 256-bit AES enciphered blocks and then base 64 encoded in the database. These 4 blocks are tied to the base 64 encoded enciphered session key 121 and plain text mail header information.

In one embodiment, the email database host 140 may further comprise RAID 5 or RAID 6 disk arrays for redundant/fault tolerant data storage. The email database host 140 could then be configured to always maintain a redundant/fault tolerant copy of the stored data. This practice may allow current data to remain synchronized with any copy of the stored data and prevent deleted messages from reappearing and causing unexpected or unwanted consequences.

Referring again to FIGS. 2, 4, and 5, retrieval of enciphered message 116 for display on a recipient user's computer may involve substantially the reverse of at least portions of the storage process. Upon the control node 125 of application host 100 receiving user login credentials and a request to transmit the enciphered message 116 for display, the decipher key 139a may be obtained from the key store 130. Using the decipher key 124, the decipher module 123 may decipher the decipher key 139a producing the key 122, one of a pair of asymmetric keys. Decipher key may be comprised of the password 126 or the password indicia 127 of the user 20. The enciphered message 116 and the enciphered session key 121 may be sent from the email database host 140, where it may have been stored remotely previously, to the application host 100 through the database port 103. The enciphered message 116 may go to the encipher module 115, and the enciphered session key 121 may go to encipher module 120. The encipher module 120 may use key 122 to decipher enciphered session key 121 into the session key 117. The encipher module 115 may use the session key 117 to decipher the enciphered message 116 into compressed message 114. The compression module 113 may decompress the compressed message 114 into the message 112. In some embodiments, the control node 125 may encipher the message 112 using SSL encipher for transmission to the recipient user.

In some embodiments, the storage space 148 (as shown in FIG. 5) on the email database host 140 may comprise memory allocated for unauthenticated messages from senders. Such storage space 148 may hold unauthenticated messages pending user approval, pursuant to a system policy. The unauthenticated messages may be stored in enciphered format.

Figure 6:
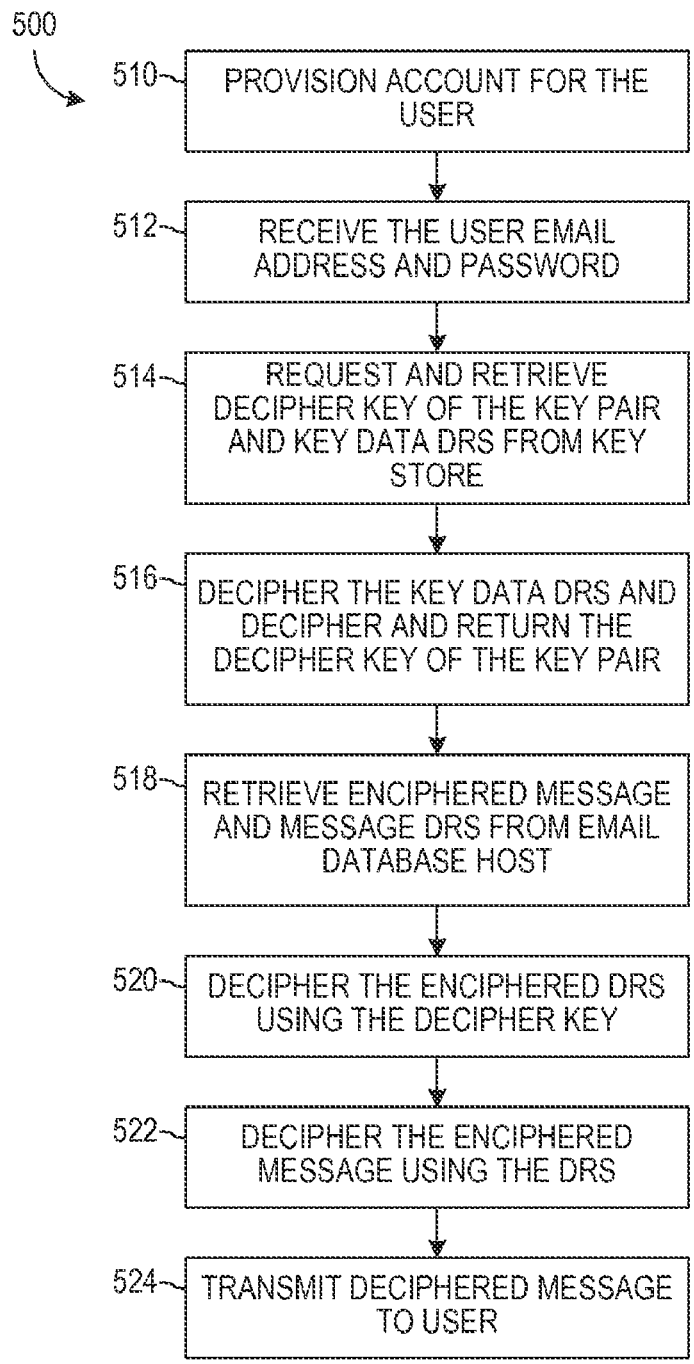
FIG. 6 shows a flow diagram for at least one embodiment of a method for secure email communication.

Referring now to FIG. 6, there is shown a flow diagram showing the operations performed in at least one embodiment of a method for securing data on the secure email system 10. In operation 510, the secure email system may provision an account for the user, which may include creating a unique email address, generating a key pair comprising a public encipher key and private decipher key pair, and creating a file on the secure email system 10. The key pair may be one or more of a pair of asymmetric keys for enciphering or deciphering data. The key pair may be further secured with a Dynamic Row Secret created by a random number generator algorithm, one or more user credentials, and a public encipher key of the key store. The key pair, which may be enciphered, may be stored in the remote key store along with the DRS, which may also be enciphered using the public encipher key of the key store.

In operation 512, the application database host may receive the user email address and password at a login screen. The application database host may test the domain to determine if it is active, test the account to determine if it is active, test the account to determine whether it is an active plan, and test the user password against a stored MD5 hash of the user password. Upon a successful login, the application host may initiate the user session, allowing the user to access data stored in the secure data system 10.

The application host may transmit an Inbox view to the user as an interface to the secure data system. The Inbox view may be transmitted over a secure internet connection, over phone lines, over a wireless network, or by any means that would be obvious to a person of ordinary skill.

In operation 514, the application host may request and retrieve from the key store through a private SSL connection the private decipher key of the user. The private decipher key may be in an enciphered form along with an enciphered DRS. The credentials of the user, such as the user id, password, and a $userid may be utilized to access the keys of the user stored in the key store. The $userid may be a variable calculated from one or more credentials of the user. In some embodiments, the $userid may be calculated from the email address of the user.

In operation 516, the application data host may decipher the keys of the user. In some embodiments, the enciphered key data DRS of the user may be deciphered using the public decipher key of the key store, The enciphered private decipher key of the user may be deciphered using the key data DRS of the user and the password of the user. The private decipher key may be returned to the application host.

In operation 518, secure data associated with the user may be retrieved at the request of the user. The user may access messages containing secure data through the Inbox view, or in other manners that are obvious to a person of ordinary skill in the art. Messages may comprise email messages received from other entities or other forms of received data. The application host may request data from the email database host comprising enciphered message data and an enciphered message DRS.

In operation 520, the application host may base64 decode the enciphered message DRS and decipher the message DRS using the private decipher key of the user.

In operation 522, the application host may base64 decode the enciphered message and decipher the message using the message DRS producing a compressed message that is un-enciphered. The compressed message may be decompressed producing an uncompressed and un-enciphered message. In operation 524, the application host may transmit the message to the user, according to the requesting process.

Figure 7:
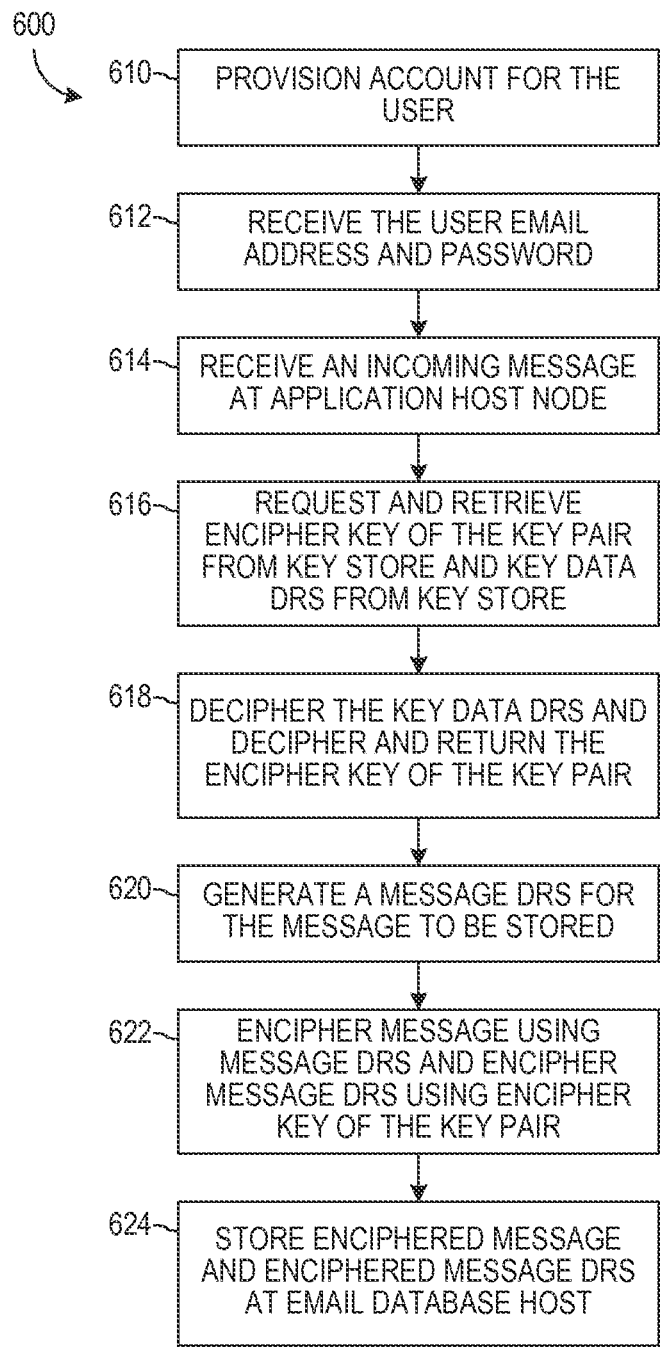
FIG. 7 shows a flow diagram for at least one other embodiment of a method for secure email communication.

Referring now to FIG. 7, there is presented a flow chart for operations in at least one embodiment for a method 600 for storing data on the secure email system 10. It assumed that operations 610 (provisioning an account from a user) and 612 (initiating a user session) be performed in the same way as operations 510 and 512 as described for FIG. 6.

It should be understood that in other embodiments, the operations 610 and 612 may not be necessary for the performance of the operations illustrated in FIG. 6. For example, an incoming email message may be stored on the secure email system 10 while the user is not logged into the application data host. The incoming message may comprise a message sent to the user or a message that is stored by the user, such as storing a copy of a sent message from the user to a recipient.

In operation 614, the application data host may receive an incoming message from an internet connection or other public connection, where the message is addressed to the user. The application data host may calculate a $userid of the user based on the email address of the user.

In operation 616, the application data host may request a private encipher key of the user from the remote key store through a private SSL connection. The key store may retrieve key data comprising enciphered keys of the user and the enciphered key data DRS of the user. The enciphered keys may be one or more of a pair of asymmetric keys for enciphering or deciphering data. The application host may utilize the $userid and other credentials of the user to make the request.

In operation 618, the key store may decipher the key data DRS using the public decipher key of the key store. The key data is deciphered using the DRS producing the public encipher key and the enciphered private encipher key of the user. In some embodiments, the enciphered private encipher key is deciphered using a user's credential such as his password.

In operation 620, the application host may generate a new message DRS for the message to be stored. The message data may be compressed. In some embodiments, the message data may be compressed using gzip compression to eliminate text patterns.

In operation 622, the compressed message data may be enciphered using the message DRS and base64 encoded. The message DRS may be enciphered using the private encipher key of the user and base64 encoded. In operation 624, the enciphered message and message DRS may be transmitted from the application host and stored remotely in the email database host.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

We claim the following:

1. A method of securing a digital data stream, the method comprising:
   receiving, at a first location, a first key of a first asymmetric key pair from a remote key store;
   deciphering the first key of the first asymmetric key pair with a first key of a second asymmetric key pair;
   receiving a dynamically generated key;
   enciphering the digital data stream with the dynamically generated key;
   enciphering the dynamically generated key with the first key of the first asymmetric key pair; and
   storing the enciphered digital data stream and the enciphered dynamically generated key.

2. The method of claim 1, further comprising:
   sampling a random number source; and
   generating the dynamically generated encipher key based on the sampling.

3. The method of claim 1, wherein enciphering the digital data stream comprises enciphering the digital data stream with a symmetric encipher algorithm.

4. The method of claim 1, further comprising deleting one or more copies of the dynamically generated key at the first location.

5. The method of claim 1, wherein the storing comprises associating, using a database, the enciphered digital data stream with the enciphered dynamically generated key.

6. The method of claim 1, further comprising compressing the digital data stream.

7. The method of claim 1, further comprising:
receiving the digital data stream; and
correlating the digital data stream with the first asymmetric key pair based on an identified recipient for the digital data stream.

8. The method of claim 1, wherein at least one of the enciphered digital data stream and the enciphered dynamically generated key are stored at a location remote from the first location and the key store.

9. The method of claim 1, wherein the first location is a host node.

10. A communications security system comprising:
a key store comprising a paired key list relating a first asymmetric key pair with at least one of a user indicia and a credential indicia;
a database node, remote from the key store, wherein the database node comprises a database containing an enciphered message and an enciphered session key; and
a host node remotely coupled to the key store through a key port and the database node through a database port, wherein the host node comprises:
a data stream port;
a dynamic key generation module;
a first encipher module;
a second encipher module; and
a decipher module;
wherein the host node is configured to receive a first key of the asymmetric key pair from the key store, and wherein the decipher module is configured to decipher the first key of the first asymmetric key pair with a first key of a second asymmetric key pair.

11. The system of claim 10, wherein the first encipher module comprises a symmetric encipher module coupled to the key generation module, the data stream port and the database port.

12. The system of claim 10, wherein the second encipher module comprises an asymmetric encipher module coupled to the key generation module, the key port and the database port.

13. The system of claim 10, wherein the host node further comprises a compression module coupled between the first encipher module and the data stream port.

14. The system of claim 10, further comprising a hardware random number generator coupled to the key generation module.

15. The system of claim 10, wherein the decipher module comprises an asymmetric decipher module coupled between the second encipher module and the key port.

16. The system of claim 15, wherein the key store further comprises an asymmetric encipher module coupled between the paired key list and the key port.

* * * * *